(12) United States Patent
Shibata

(10) Patent No.: US 11,347,448 B2
(45) Date of Patent: May 31, 2022

(54) COMMUNICATION DEVICE

(71) Applicant: Brother Kogyo Kabushiki Kaisha, Nagoya (JP)

(72) Inventor: Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 36 days.

(21) Appl. No.: 16/911,489

(22) Filed: Jun. 25, 2020

(65) Prior Publication Data

US 2020/0326895 A1    Oct. 15, 2020

Related U.S. Application Data

(63) Continuation of application No. 16/359,522, filed on Mar. 20, 2019, now Pat. No. 10,719,280.

(30) Foreign Application Priority Data

Mar. 30, 2018    (JP) .............................. JP2018-068817

(51) Int. Cl.
*G06F 3/12* (2006.01)
*G06F 21/36* (2013.01)
(Continued)

(52) U.S. Cl.
CPC .......... *G06F 3/1222* (2013.01); *G06F 3/1236* (2013.01); *G06F 3/1238* (2013.01);
(Continued)

(58) Field of Classification Search
CPC .... G06F 3/1222; G06F 3/1238; G06F 3/1292; G06F 21/36; G06F 21/608; G06F 3/1236;
(Continued)

(56) References Cited

U.S. PATENT DOCUMENTS 10,178,551 B2    1/2019    Goto
10,285,027 B2    5/2019    Terashita
(Continued)

FOREIGN PATENT DOCUMENTS

JP    2017-028454 A    2/2017
JP    2017-069721 A    4/2017
(Continued)

OTHER PUBLICATIONS

Wi-Fi Alliance, "DRAFT Device Provisioning Protocol Technical Specification", Version 0.2.11, pp. 1-133, 2017.
Feb. 22, 2022—(JP) Notification of Reasons for Rejection—JP App 2018-068817, Eng Tran.

*Primary Examiner* — Darryl V Dottin
(74) *Attorney, Agent, or Firm* — Banner & Witcoff, Ltd.

(57) ABSTRACT

A communication device may receive a specific signal from a first external device; after the specific signal has been received from the first external device, cause an output unit of the communication device to output specific information obtained by using a public key; after the specific information has been outputted, receive an authentication request in which the public key is used from the first external device; in a case where the authentication request is received from the first external device, send an authentication response to the first external device; after the authentication response has been sent to the first external device, receive connection information from the first external device; and in a case where the connection information is received from the first external device, establish, by using the connection information, a wireless connection between the communication device and a second external device.

20 Claims, 9 Drawing Sheets

(51) Int. Cl.
*G06K 7/14* (2006.01)
*G06F 21/60* (2013.01)
*H04W 12/041* (2021.01)
*H04W 12/047* (2021.01)
*H04W 12/55* (2021.01)

(52) U.S. Cl.
CPC ............ *G06F 3/1292* (2013.01); *G06F 21/36* (2013.01); *G06F 21/608* (2013.01); *G06K 7/1417* (2013.01); *H04W 12/041* (2021.01); *H04W 12/047* (2021.01); *H04W 12/55* (2021.01); *G06F 3/12* (2013.01); *G06F 3/1204* (2013.01)

(58) Field of Classification Search
CPC ........ G06F 21/445; G06F 3/1204; G06F 3/12; H04W 12/041; H04W 12/047; H04W 12/55; G06K 7/1417
USPC .......................................................... 358/1.15
See application file for complete search history.

(56) References Cited

U.S. PATENT DOCUMENTS

| | | | |
|---|---|---|---|
| 10,609,532 | B2 | 3/2020 | Terashita |
| 10,701,050 | B2 | 6/2020 | Hamachi |
| 2014/0173289 | A1 | 6/2014 | Casilli |
| 2017/0026833 | A1 | 1/2017 | Goto |
| 2017/0094441 | A1 | 3/2017 | Terashita |
| 2017/0180342 | A1 | 6/2017 | Hamachi |
| 2018/0069718 | A1 | 3/2018 | Terao |
| 2018/0077255 | A1 | 3/2018 | Goto |
| 2018/0184296 | A1* | 6/2018 | Hunt .................... G06K 7/1417 |
| 2019/0261147 | A1 | 8/2019 | Terashita |

FOREIGN PATENT DOCUMENTS

| | | |
|---|---|---|
| JP | 2017-112552 A | 6/2017 |
| JP | 2018-006983 A | 1/2018 |
| JP | 2018-037978 A | 3/2018 |
| JP | 2018-046435 A | 3/2018 |
| WO | 2018-003722 A1 | 1/2018 |

* cited by examiner (Network Access)

(Bootstrapping: Case C)

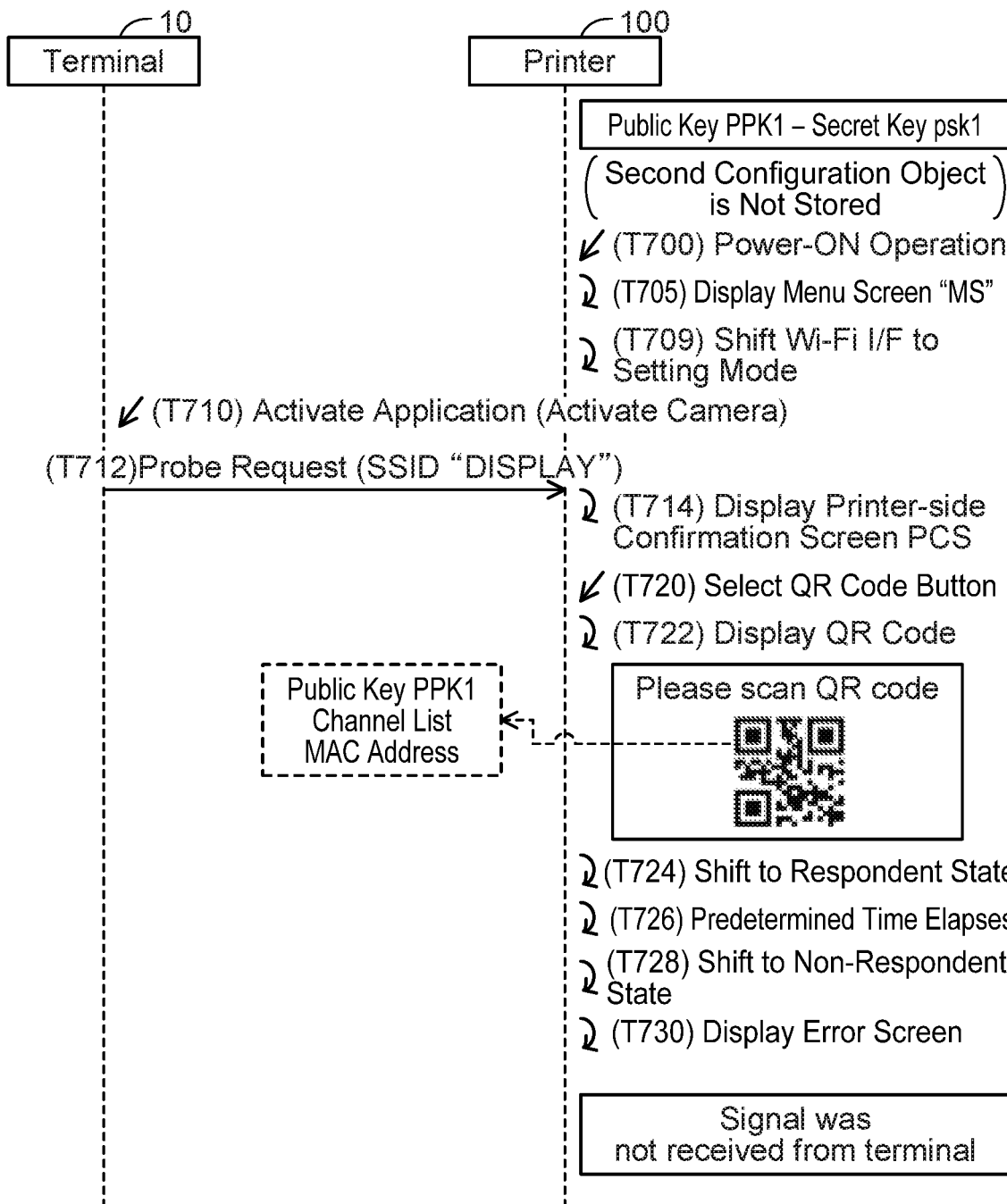

COMMUNICATION DEVICE

CROSS-REFERENCE

This application is a Continuation of U.S. application Ser. No. 16/359,522 filed on Mar. 20, 2019. U.S. application Ser. No. 16/359522 which claims priority to Japanese Patent Application No. 2018-068817, filed on Mar. 30, 2018, the entire contents of which are incorporated herein by reference.

TECHNICAL FIELD

The disclosure herein discloses a technique related to a communication device configured to establish a wireless connection with an external device.

BACKGROUND ART

A technique is known for establishing a wireless connection between a camera and an Access Point (AP) by using a smartphone. The camera displays a QR code (registered trademark) including information for setting communication parameters in response to accepting an operation from a user, and starts monitoring receipt of a search signal. The smartphone obtains the information for setting communication parameters by reading the QR code displayed on the camera, and sends a search signal to the camera. In a case of receiving the search signal from the smartphone, the camera sends a response for the search signal to the smartphone. In a case of receiving the response from the camera, the smartphone sets the communication parameters by using the obtained information, and sends the set communication parameters to the camera. Further, the smartphone executes the similar processes with the AP, and sends the communication parameters to the AP. Due to this, the camera can establish the wireless connection with the AP by using the received communication parameters.

SUMMARY

The disclosure herein discloses a novel technique for establishing a wireless connection between a communication device and a second external device by using a first external device.

A communication device disclosed herein may comprise: an output unit; a wireless interface; a processor; and a memory storing computer-readable instructions therein, the computer-readable instructions, when executed by the processor, causing the communication device to: receive a specific signal from a first external device via the wireless interface; after the specific signal has been received from the first external device, cause the output unit to output specific information obtained by using a public key, wherein due to the specific information being outputted, the public key is obtained by the first external device; after the specific information has been outputted, receive an authentication request in which the public key is used from the first external device via the wireless interface; in a case where the authentication request is received from the first external device, send an authentication response to the first external device via the wireless interface; after the authentication response has been sent to the first external device, receive connection information from the first external device via the wireless interface, the connection information being for establishing a wireless connection between the communication device and a second external device via the wireless interface; and in a case where the connection information is received from the first external device, establish, by using the connection information, the wireless connection between the communication device and the second external device via the wireless interface.

Another communication device disclosed herein may comprise: a wireless interface; a processor; and a memory storing computer-readable instructions therein, the computer-readable instructions, when executed by the processor, causing the communication device to: receive a specific signal from a first external device via the wireless interface; after the specific signal has been received from the first external device, shift an operation state of the communication device from a non-respondent state to a respondent state, the non-respondent state being a state in which an authentication response is not sent in response to receiving an authentication request from the first external device, the respondent state being a state in which the authentication response is sent to the first external device in response to receiving the authentication request from the first external device; receive the authentication request from the first external device via the wireless device; in a case where the authentication request is received from the first external device after the operation state of the communication device has shifted to the respondent state, send the authentication response to the first external device via the wireless interface; after the authentication response has been sent to the first external device, receive connection information from the first external device via the wireless interface, the connection information being for establishing a wireless connection between the communication device and a second external device via the wireless interface; and in a case where the connection information is received from the first external device, establish, by using the connection information, the wireless connection between the communication device and the second external device via the wireless interface.

Computer programs for realizing the above communication devices, and non-transitory computer-readable recording media that store these computer programs are also novel and useful. Further, methods performed by the above communication devices are also novel and useful. In addition, communication systems comprising the above communication devices and another device (e.g., the first external device, the second external device) are also novel and useful.

BRIEF DESCRIPTION OF THE DRAWINGS

FIG. 9 shows a sequence diagram of a Bootstrapping process of Case D.

EMBODIMENT (Configuration of Communication System 2; FIG. 1)

As shown in FIG. 1, a communication system 2 is provided with an Access Point (AP) 6, a terminal 10, and a printer 100. In this embodiment, a situation is assumed in which a user uses the terminal 10 to establish a wireless connection according to a Wi-Fi scheme (hereinbelow termed "Wi-Fi connection") between the printer 100 and the AP 6.

(Configuration of Terminal 10)

Figure 1:
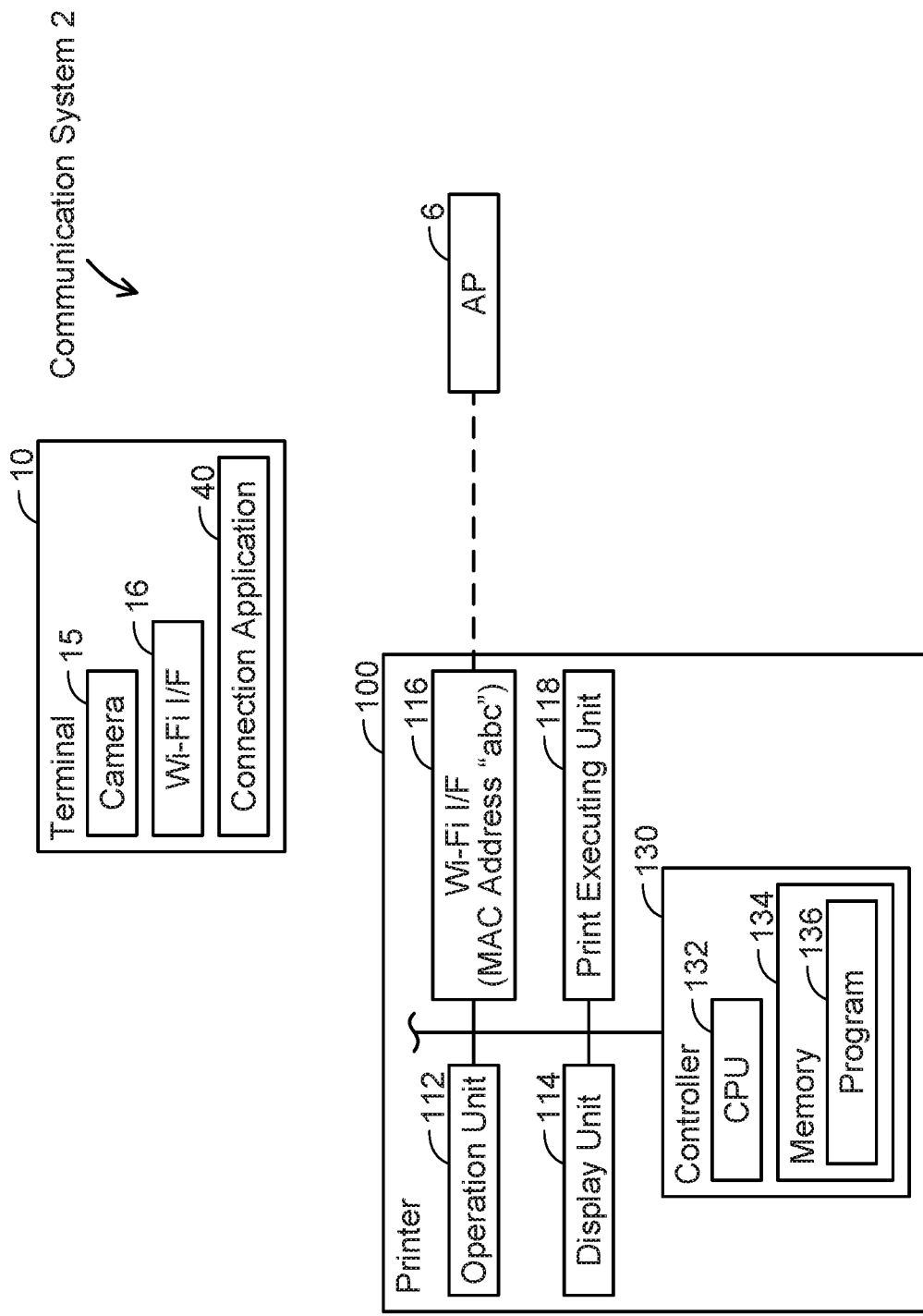
FIG. 1 shows a configuration of a communication system.

The terminal 10 is a mobile terminal device such as a cellphone (such as a smartphone), a PDA, or a tablet PC. In a variant, the terminal 10 may be a stationary PC, or a laptop PC. The terminal 10 is provided with a camera 15 and a Wi-Fi interface 16. Hereinbelow, an interface will be denoted simply as "I/F". The camera 15 is a device for capturing an image of an object, and in this embodiment, it is used especially to capture a QR code for the AP 6 and the printer 100. Further, the terminal 10 stores a connection application 40 (hereinbelow termed simply as "app 40"). The app 40 is a program for establishing the Wi-Fi connection between the printer 100 and the AP 6, and may be installed to the terminal 10, for example, from a server on the Internet provided by a vendor of the printer 100.

The Wi-Fi I/F 16 is a wireless interface configured to execute Wi-Fi communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, 11ac, etc.), for example. The Wi-Fi I/F 16 especially supports a Device Provisioning Protocol (DPP) scheme that is to be established by the Wi-Fi Alliance. The DPP scheme is described in the standard draft "DRAFT Device Provisioning Protocol Technical Specification Version 0.2.11" created by the Wi-Fi Alliance, and is a wireless communication scheme for easily establishing a Wi-Fi connection between a pair of devices (such as the printer 100 and the AP 6) by using the terminal 10.

(Configuration of Printer 100)

The printer 100 is a peripheral (e.g., a peripheral of the terminal 10) capable of executing a print function. The printer 100 is provided with an operation unit 112, a display unit 114, a Wi-Fi I/F 116, a print executing unit 118, and a controller 130. The respective units 112 to 130 are connected to a bus line (for which a reference sign is not given).

The operation unit 112 is provided with a plurality of keys. The user can input various instructions to the printer 100 by operating the operation unit 112. The display unit 114 is a display configured to display various types of information. The Wi-Fi I/F 116 is similar to the Wi-Fi I/F 16 of the terminal 10. That is, the Wi-Fi I/F 116 supports the DPP scheme. Further, the Wi-Fi I/F 116 is assigned with a MAC address "abc". The print executing unit 118 includes a print mechanism of an inkjet scheme or a laser scheme.

The controller 130 includes a CPU 132 and a memory 134. The CPU 132 is configured to execute various processes according to a program 136 stored in the memory 134. The memory 134 is constituted of a volatile memory, a nonvolatile memory and the like.

Figure 2:
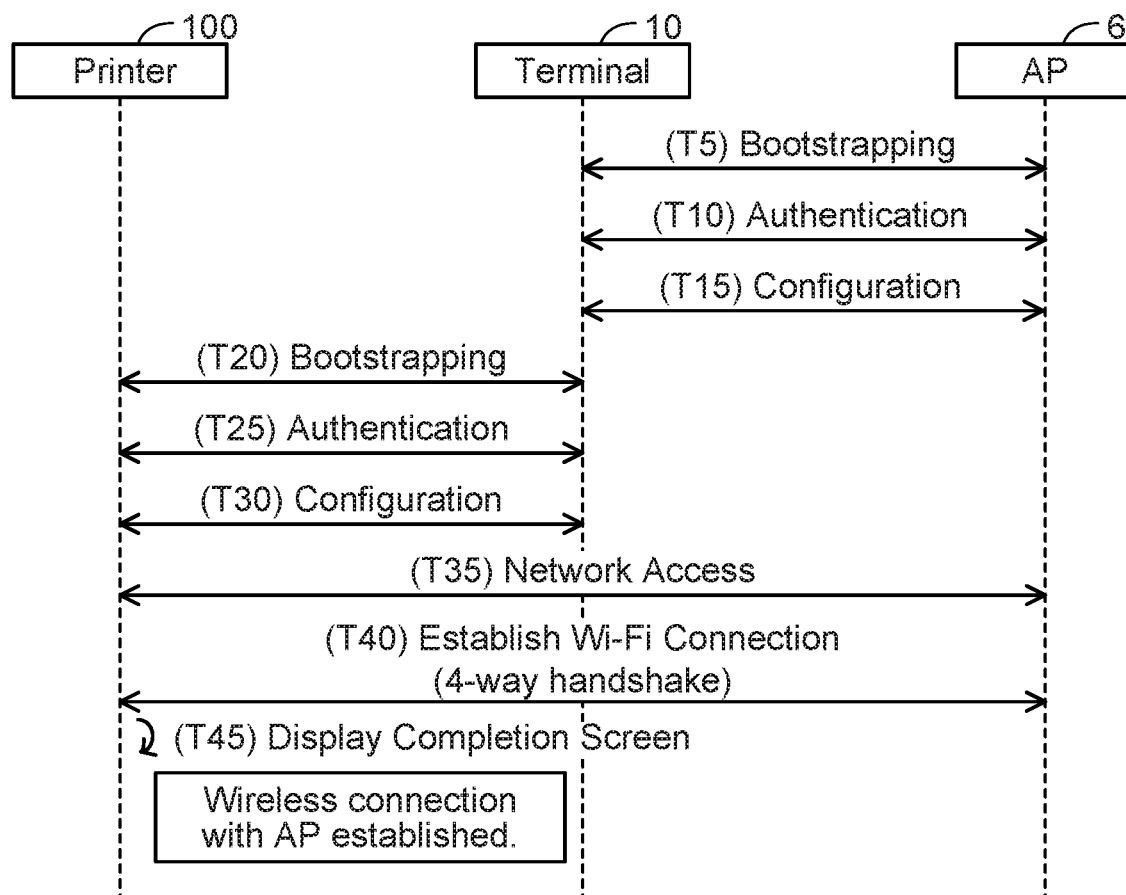
FIG. 2 shows an explanatory diagram explaining an overview of an embodiment.

(Overview of Embodiment; FIG. 2)

Next, an overview of the present embodiment will be described with reference to FIG. 2. As aforementioned, the terminal 10 and the printer 100 support the DPP scheme, and further the AP 6 also supports the DPP scheme. In this embodiment, the Wi-Fi connection between the printer 100 and the AP 6 is established by each of the devices 6, 10, 100 executing communication according to the DPP scheme. Hereinbelow, to facilitate understanding, operations which CPUs (such as the CPU 132) of the respective devices execute will be described with the devices (such as the printer 100) as subjects of action instead of describing the operations with the CPUs as the subjects of action.

In T5, the terminal 10 executes Bootstrapping (hereinbelow termed simply as "BS") according to the DPP scheme with the AP 6. This BS is a process of providing information that is to be used in Authentication (hereinbelow termed simply as "Auth") of T10 (to be described later) from the AP 6 to the terminal 10 in response to a QR code adhered to the AP 6 being captured by the terminal 10.

In T10, the terminal 10 executes Auth according to the DPP scheme with the AP 6 by using the information obtained in the BS of T5. This Auth is a process for the terminal 10 and the AP 6 to authenticate their communication counterparts.

In T15, the terminal 10 executes Configuration (hereinbelow termed simply as "Config") according to the DPP scheme with the AP 6. This Config is a process of sending information for establishing the Wi-Fi connection between the printer 100 and the AP 6 to the AP 6. Specifically, in the Config, the terminal 10 creates a first Configuration Object (hereinbelow, Configuration Object is simply be termed "CO") for establishing the Wi-Fi connection between the printer 100 and the AP 6, and sends the first CO to the AP 6. As a result, the first CO is stored in the AP 6.

Next, the terminal 10 executes BS according to the DPP scheme with the printer 100 in T20. This BS is a process of providing information that is to be used in Auth of T25 (to be described later) from the printer 100 to the terminal 10 in response to a QR code displayed in the printer 100 being captured by the terminal 10.

In T25, the terminal 10 executes Auth according to the DPP scheme with the printer 100 by using the information obtained in the BS of T20. This Auth is a process for the terminal 10 and the printer 100 to authenticate their communication counterparts.

In T30, the terminal 10 executes Config according to the DPP scheme with the printer 100. This Config is a process of sending information for establishing the Wi-Fi connection between the printer 100 and the AP 6 to the printer 100. In this Config, the terminal 10 creates a second CO for establishing the Wi-Fi connection between the printer 100 and the AP 6, and sends the second CO to the printer 100. As a result, the second CO is stored in the printer 100.

In T35, the printer 100 and the AP 6 use the stored first and second COs to execute Network Access (hereinbelow termed simply as "NA") according to the DPP scheme. The NA is a process of sharing a connection key for establishing the Wi-Fi connection between the printer 100 and the AP 6.

In T40, the printer 100 and the AP 6 execute 4way-handshake communication. In at least a part of the 4way-handshake communication, the printer 100 and the AP 6 communicate encrypted information encrypted by the connection key shared in the NA in T35. Further, in a case where decryption of the encrypted information succeeds, the Wi-Fi connection is established between the printer 100 and the AP 6. Due to this, the printer 100 can participate, as a child station, in a wireless network formed by the AP 6, as a result of which the printer 100 can execute communication via the AP 6 with other devices participating in the wireless network. In a variant, the printer 100 and the AP 6 may execute Simultaneous Authentication of Equals (SAE, also called "Dragonfly") communication, instead of the 4way-handshake communication.

In T45, the printer 100 causes the display unit 114 to display a completion screen indicating that the Wi-Fi connection has been established with the AP 6. When the process of T45 is completed, the process of FIG. 2 is terminated.

In the DPP scheme, in order to establish the Wi-Fi connection between the printer 100 and the AP 6, the user does not need to input information of the wireless network in which the AP 6 operates as a parent station (such as a Service Set Identifier (SSID) and a password) to the printer 100. As such, the user can easily establish the Wi-Fi connection between the printer 100 and the AP 6.

(Description on Respective Processes; FIGS. 3 to 9)

Next, details of the respective processes executed in T20 to T35 of FIG. 2 will be described with reference to FIGS. 3 to 9. Since the processes of T5 to T15 are similar to the processes of T20 to T30 except that the AP 6 is used instead of the printer 100, the detailed description thereof will be omitted. Further, FIG. 3 and FIGS. 7 to 9 respectively show different cases of the BS executed between the terminal 10 and the printer 100. These cases are processes executed in one embodiment.

Figure 3:
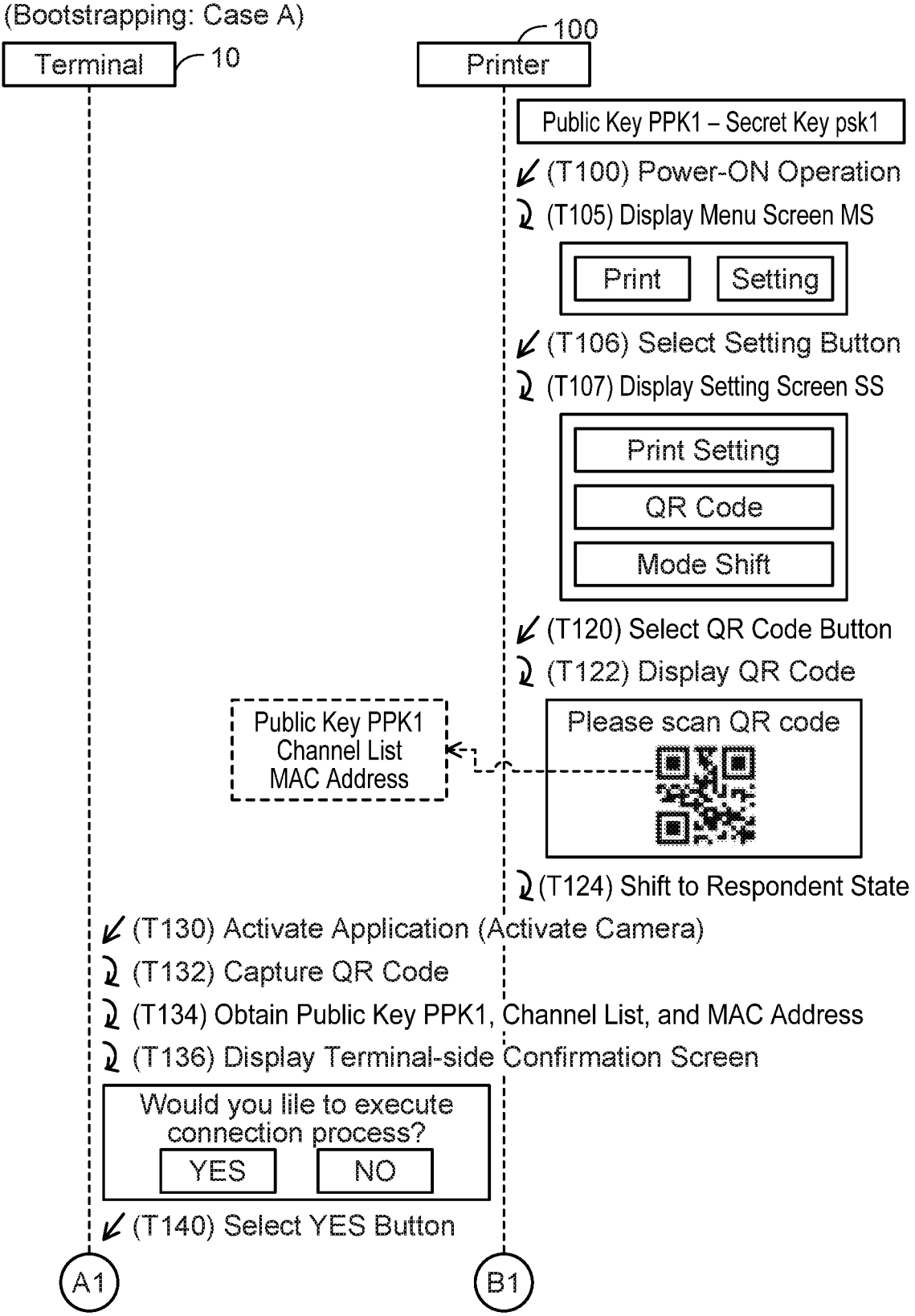
FIG. 3 shows a sequence diagram of a Bootstrapping process of Case A.

(Bootstrapping (BS) of Case A; FIG. 3)

Firstly, a process of the BS of Case A in T20 of FIG. 2 will be described with reference to FIG. 3. In an initial state of FIG. 3, the memory 134 of the printer 100 stores in advance a public key PPK1 and a secret key psk1 of the printer 100.

In response to accepting a power-ON operation by the user in T100, the printer 100 causes the display unit 114 to display a menu screen MS in T105. The screen MS is a default screen of the printer 100 in other words, and includes a print button for causing the printer 100 to execute print and a setting button for designating various settings (such as print setting) of the printer 100.

In response to the setting button in the screen MS being selected by the user in T106, the printer 100 causes the display unit 114 to display a setting screen SS in T107. The screen SS includes a print setting button for changing print settings of the printer 100, a QR code button for causing the printer 100 to display a QR code, and a mode shift button for changing an operation mode of the Wi-Fi I/F 116.

In response to the QR code button in the screen SS being selected by the user in T120, the printer 100 causes the display unit 114 to display a QR code in T122. This QR code is a code image obtained by coding the public key PPK1 stored in advance in the memory 134, a channel list stored in advance in the memory 134, and the MAC address "abc" of the Wi-Fi I/F 116. The channel list is a list of values of a plurality of communication channels to be used in the Auth (see T25 of FIG. 2). This QR code may be created by the printer 100 when the process of T122 is executed, or may be stored in advance in the memory 134 at a shipping of the printer 100.

Next, in T124, the printer 100 shifts from a non-respondent state to a respondent state. The non-respondent state is a state in which the Wi-Fi I/F 116 does not send a DPP Authentication Response (hereinbelow simply termed "ARes") (see T210 of FIG. 4 to be described later) even if a DPP Authentication Request (hereinbelow simply termed "AReq") is received from the terminal 10 (see T200 to be described later). The respondent state is a state in which the Wi-Fi I/F 116 sends the ARes to the terminal 10 in response to receiving the AReq from the terminal 10. That is, the printer 100 shifts to a state of being able to execute the Auth (see T25 of FIG. 2) by shifting from the non-respondent state to the respondent state. Specifically, in this embodiment, the non-respondent state is a state in which even if the Wi-Fi I/F 116 receives a signal from outside, it does not supply the signal to the CPU 132. Further, the respondent state is a state in which in response to receiving a signal from outside, the Wi-Fi I/F 116 supplies the signal to the CPU 132 and sends a response for this signal. Since the respondent state is a state in which the CPU 132 processes the signal received from outside, processing load in that state is higher than that in the non-respondent state. In a variant, the non-respondent state may be a state in which electricity is not supplied to the Wi-Fi I/F 116, and the respondent state may be a state in which electricity is supplied to the Wi-Fi I/F 116. Further, in another variant, the non-respondent state may be a state in which even if the Wi-Fi I/F 116 receives the AReq from outside, the Wi-Fi I/F 116 does not supply a notification that the AReq has been received to the CPU 132, and the respondent state may be a state in which in response to receiving the AReq from outside, the Wi-Fi I/F 116 supplies a notification that the AReq has been received to the CPU 132.

The terminal 10 activates the app 40 in T130 in response to accepting an activation operation for the app 40 by the user, and further activates the camera 15. Following processes to be executed by the terminal 10 are realized by the app 40. Next, in T132, the terminal 10 captures the QR code displayed on the printer 100 (see T122) by using the camera 15. Further, in T134, the terminal 10 decodes the captured QR code and obtains the public key PPK1, the channel list, and the MAC address "abc".

In T136, the terminal 10 displays a terminal-side confirmation screen TCS for inquiring the user whether or not to execute a connection process for establishing the Wi-Fi connection between the printer 100 and the AP 6. The screen TCS includes a YES button indicating that the connection process is to be executed and a NO button indicating that the connection process is not to be executed. In T140, the terminal 10 accepts a selection of the YES button in the screen TCS by the user. When the process of T140 is completed, the process of the BS of Case A is terminated.

Figure 4:
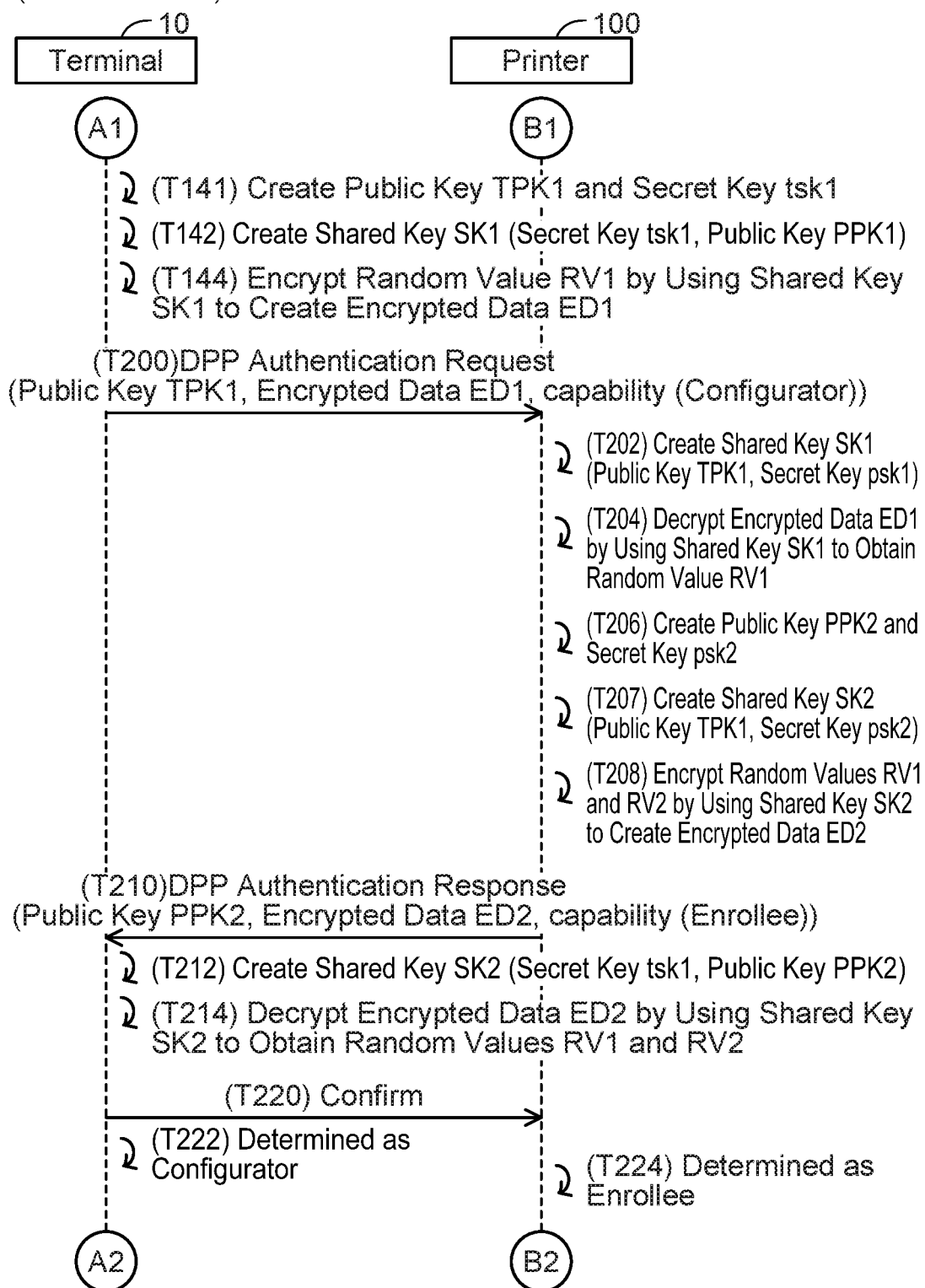
FIG. 4 shows a sequence diagram of an Authentication process.

(Authentication (Auth); FIG. 4)

Next, the process of the Auth in T25 of FIG. 2 will be described with reference to FIG. 4. In response to the YES button in the screen TCS being selected by the user in T140 of FIG. 3, the terminal 10 creates a public key TPK1 and a secret key tsk1 of the terminal 10 in T141. Next, in T142, the terminal 10 creates a shared key SK1 according to Elliptic curve Diffie-Hellman key exchange (ECDH) by using the created secret key tsk1 and the public key PPK1 of the printer 100 obtained in T134 of FIG. 3. Then, in T144, the terminal 10 creates encrypted data ED1 by using the created shared key SK1 to encrypt a random value RV1.

In T200, the terminal 10 sends an AReq via the Wi-Fi I/F 16 to the printer 100 by setting the MAC address "abc" obtained in T134 of FIG. 3 as its destination. The AReq is a signal for requesting the printer 100 to execute authentication. Here, the terminal 10 repeats sending the AReq to the printer 100 by sequentially using the plurality of communication channels in the channel list obtained in T134. The AReq includes the public key TPK1 of the terminal 10 created in T141, the encrypted data ED1 created in T144, and a capability of the terminal 10.

The capability is information that is pre-designated in a device supporting the DPP scheme, and includes any one of the following values: a value indicating that this device is capable of operating only as a Configurator according to the DPP scheme, a value indicating that this device is capable of operating only as an Enrollee according to the DPP scheme, and a value indicating that this device is capable of operating whichever one of the Configurator and the Enrollee. The Configurator refers to a device configured to send a CO used in the NA (T35 of FIG. 2) to an Enrollee in the Config (T30 of FIG. 2). On the other hand, the Enrollee refers to a device that receives the CO used in the NA from the Configurator in the Config. As above, in this embodiment, the terminal 10 creates the first and second COs and sends them respectively to the AP 6 and the printer 100. As such, the capability of the terminal 10 includes the value indicating that it is capable of operating only as the Configurator.

The printer 100 receives the AReq from the terminal 10 via the Wi-Fi I/F 116 in T200. As above, this AReq is sent with the MAC address "abc" of the printer 100 as the destination. As such, the printer 100 can suitably receive this AReq from the terminal 10.

Further, when the printer 100 shifts to the respondent state in T124 of FIG. 3, it monitors receipt of the AReq by using one communication channel among the plurality of communication channels in the channel list. As above, the AReq in T200 is sent by sequentially using the plurality of communication channels in the channel list. As such, the printer 100 can suitably receive this AReq from the terminal 10.

Next, the printer 100 executes following processes for authenticating the sender of the AReq (that is, the terminal 10). Specifically, firstly, in T202, the printer 100 creates a shared key SK1 according to the ECDH by using the public key TPK1 of the terminal 10 in the AReq and the secret key psk1 of the printer 100 stored in advance in the memory 134. Here, the shared key SK1 created by the terminal 10 in T142 and the shared key SK1 created by the printer 100 in T204 are identical to each other. Thus, the printer 100 can suitably decrypt the encrypted data ED1 in the AReq by using the created shared key SK1 in T204, as a result of which it can obtain the random value RV1. In a case where the decryption of the encrypted data ED1 succeeds, the printer 100 determines that the sender of the AReq is the device that captured the QR code displayed on the printer 100, that is, determines that the authentication succeeded, and executes subsequent processes from T206. On the other hand, in a case where the decryption of the encrypted data ED1 does not succeed, the printer 100 determines that the sender of the AReq is not the device that captured the QR code displayed on the printer 100, that is, determines that the authentication failed, and does not execute the subsequent processes from T206.

In T206, the printer 100 creates a new public key PPK2 and a new secret key psk2 of the printer 100. In a variant, the public key PPK2 and the secret key psk2 may be stored in advance in the memory 134. Next, in T207, the printer 100 creates a shared key SK2 according to the ECDH by using the public key TPK1 of the terminal 10 in the AReq of T200 and the created secret key psk2 of the printer 100. Then, in T208, the printer 100 creates encrypted data ED2 by using the created shared key SK2 to encrypt the obtained random value RV1 and a new random value RV2.

In T210, the printer 100 sends an ARes to the terminal 10 via the Wi-Fi I/F 116. This ARes includes the public key PPK2 of the printer 100 created in T206, the encrypted data ED2 created in T208, and a capability of the printer 100. This capability includes the value indicating that the printer 100 is capable of operating only as the Enrollee.

In response to receiving the ARes from the printer 100 via the Wi-Fi I/F 16 in T210, the terminal 10 executes following processes for authenticating the sender of the ARes (that is, the printer 100). Specifically, firstly in T212, the terminal 10 creates a shared key SK2 according to the ECDH by using the secret key tsk1 of the terminal 10 created in T141 and the public key PPK2 of the printer 100 in the ARes. Here, the shared key SK2 created by the printer 100 in T207 and the shared key SK2 created by the terminal 10 in T212 are identical to each other. Thus, the terminal 10 can suitably decrypt the encrypted data ED2 in the ARes by using the created shared key SK2 in T214, as a result of which it can obtain the random values RV1 and RV2. In a case where the decryption of the encrypted data ED2 succeeds, the terminal 10 determines that the sender of the ARes is the device that displayed the captured QR code, that is, determines that the authentication succeeded, and executes subsequent processes from T220. On the other hand, in a case where the decryption of the encrypted data ED2 does not succeed, the terminal 10 determines that the sender of the ARes is not the device that displayed the captured QR code, that is, determines that the authentication failed, and does not execute the subsequent processes from T220.

In T220, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T222, and the printer 100 determines to operate as the Enrollee in T224. When the process of T224 is completed, the process of FIG. 4 is terminated.

Figure 5:
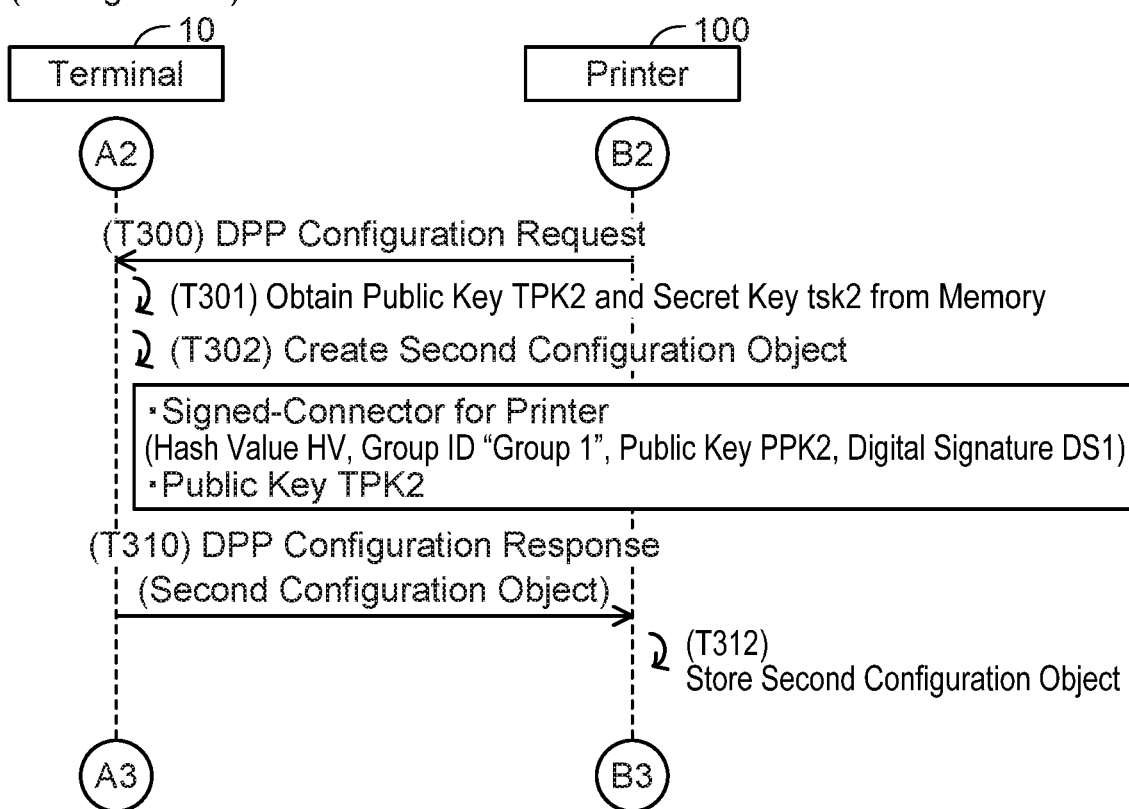
FIG. 5 shows a sequence diagram of a Configuration process.

(Configuration (Config); FIG. 5)

Next, the process of Config in T30 of FIG. 2 will be described with reference to FIG. 5. In T300, the printer 100 sends a DPP Configuration Request (hereinbelow termed simply as "CReq") to the terminal 10 via the Wi-Fi I/F 116. This CReq is a signal requesting the CO (that is, the information for establishing the Wi-Fi connection between the printer 100 and the AP 6) to be sent.

The terminal 10 receives the CReq from the printer 100 in T300 via the Wi-Fi I/F 16. In this case, the terminal 10 obtains a group ID "Group1", a public key TPK2, and a secret key tsk2 from a memory (not shown) of the terminal 10 in T301. As aforementioned, the terminal 10 have already executed the Config in T15 of FIG. 2 with the AP 6, and at that occasion the terminal 10 created the group ID "Group1", the public key TPK2, and the secret key tsk2 and stored the same in the memory. The group ID "Group1" is information for identifying a wireless network formed by the Wi-Fi connection being established between the printer 100 and the AP 6. In a variant, a character string designated by the user may be used as the group ID. That is, in T301, the terminal 10 obtains the respective information that were stored in T15 of FIG. 2. Next, in T302, the terminal 10 creates the second CO (see T30 of FIG. 2). Specifically, the terminal 10 executes following processes.

The terminal 10 creates a hash value HV by hashing the public key TPK2 of the terminal 10. Further, the terminal 10 creates a specific value by hashing a combination of the hash value HV, the group ID "Group1", and the public key PPK2 of the printer 100 in the ARes in T210 of FIG. 4. Then, the terminal 10 creates a digital signature DS1 by using the secret key tsk2 of the terminal 10 to encrypt the created specific value in accordance with an Elliptic Curve Digital Signature Algorithm (ECDSA). As a result, the terminal 10 can create a Signed-Connector for printer (hereinbelow, the Signed-Connector is termed simply as "SCont") including the hash value HV, the group ID "Group1", the public key PPK2 of the printer 100, and the digital signature DS1. Further, the terminal 10 creates the second CO including the SCont for printer and the public key TPK2 of the terminal 10.

In T310, the terminal 10 sends a DPP Configuration Response (hereinbelow termed simply as "CRes") including the second CO to the printer 100 via the Wi-Fi I/F 16.

The printer 100 receives the CRes from the terminal 10 in T310 via the Wi-Fi I/F 116. In this case, the printer 100 stores the second CO in the CRes in the memory 134 in T312. When the process of T312 is completed, the process of FIG. 5 is terminated.

Figure 6:
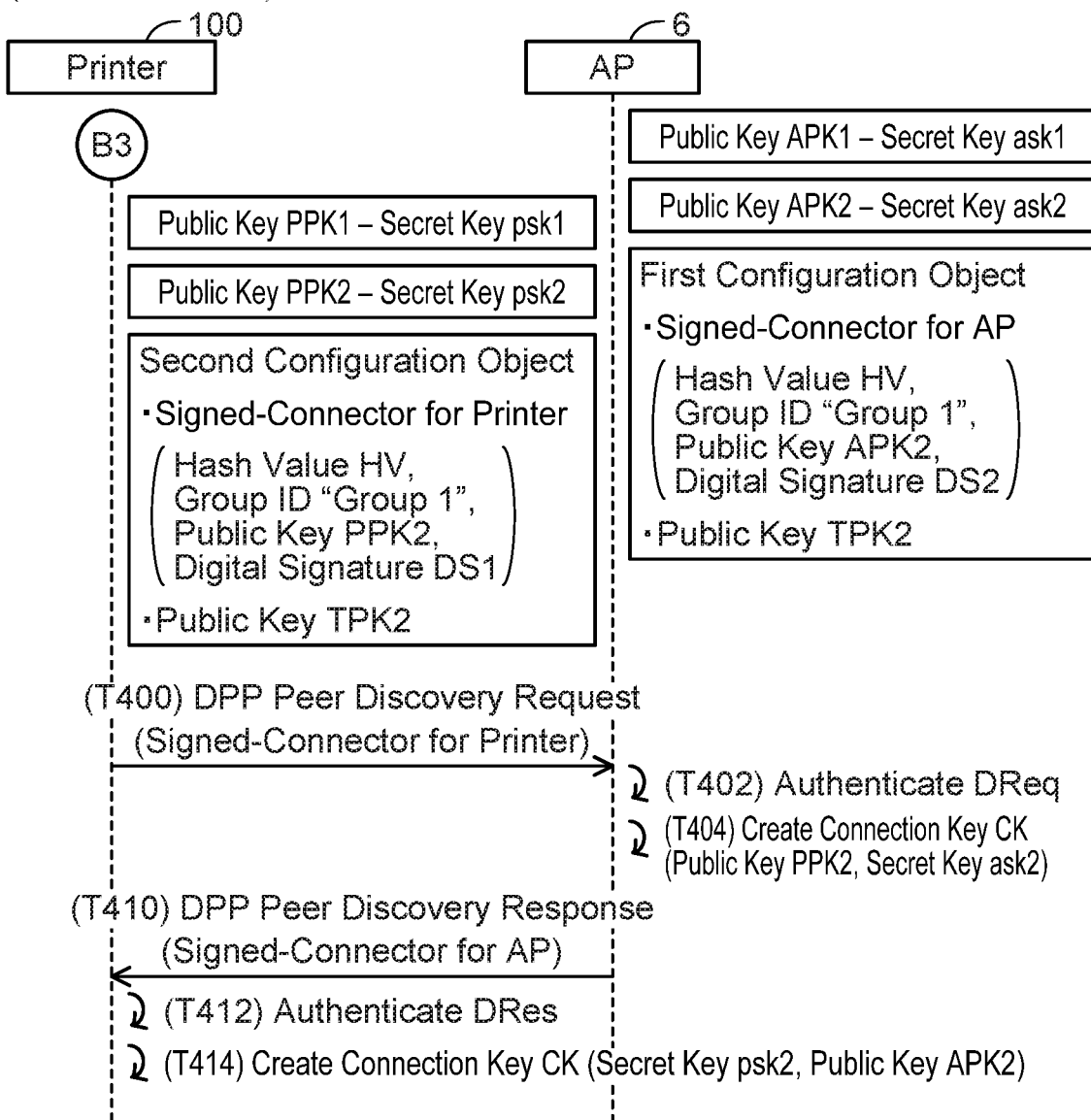
FIG. 6 shows a sequence diagram of a Network Access process.

(Network Access (NA); FIG. 6)

Next, the process of the NA in T35 of FIG. 2 executed between the printer 100 and the AP 6 will be described with reference to FIG. 6. As aforementioned, the processes of T5 to T15 of FIG. 2 have already been executed between the terminal 10 and the AP 6, similarly to T20 to T30 of FIG. 2. However, the AP 6 does not execute the processes of T105 to T124 of FIG. 3. The AP 6 stores in advance a public key APK1 and a secret key ask1 of the AP 6. Further, a QR code, which is obtained by coding the public key APK1 of the AP 6, a channel list of the AP 6, and a MAC address of the AP 6, is adhered to a housing of the AP 6. Processes similar to the processes from T134 are executed between the terminal 10 and the AP 6 when the terminal 10 captures this QR code. As a result, the AP 6 stores a public key APK2 and a secret key ask2 of the AP 6 (see T206 of FIG. 4), and further stores the first CO received from the terminal 10 (see T312 of FIG. 5). The first CO includes a SCont for AP and a public key TPK2 of the terminal 10. This public key TPK2 is identical to the public key TPK2 included in the second CO. Further, the SCont for AP includes a hash value HV, a group ID "Group1", the public key APK2 of the AP 6, and a digital signature DS2. This hash value HV and this group ID "Group1" are respectively identical to the hash value HV and the group ID "Group1" included in the second CO. The digital signature DS2 is information in which a specific value, which is obtained by hashing a combination of the hash value HV, the group ID "Group1", and the public key APK2, is encrypted by the secret key tsk2 of the terminal 10, and is a value different from the digital signature DS1 included in the second CO.

In T400, the printer 100 sends a DPP Peer Discovery Request (hereinbelow termed simply as "DReq") including the SCont for printer to the AP 6 via the Wi-Fi I/F 116. This DReq is a signal requesting the AP 6 to execute authentication and send the SCont for AP.

In response to receiving the DReq from the printer 100 in T400, the AP 6 executes a process for authenticating the sender of the DReq (that is, the printer 100) and the information in the DReq (that is, the hash value HV, the "Group1", and the public key PPK2). Specifically, in T402, the AP 6 firstly executes a first AP determination process that is regarding whether or not the hash value HV and the group ID "Group1" in the received SCont for printer are respectively identical to the hash value HV and the group ID "Group1" in the SCont for AP included in the stored first CO. In the case of FIG. 6, the AP 6 determines "identical" in the first AP determination process, thus it determines that the authentication of the sender of the DReq (that is, the printer 100) succeeds. Here, the fact that the hash value HV in the received SCont for printer is identical to the hash value HV in the SCont for AP included in the stored first CO means that the SCont for printer and the SCont for AP were created by the same device (that is, the terminal 10). As such, the AP 6 also determines that authentication of the creator of the received SCont for printer (that is, the terminal 10) succeeds. Further, the AP 6 decrypts the digital signature DS1 in the received SCont for printer by using the public key TPK2 of the terminal 10 included in the stored first CO. Since the decryption of the digital signature DS1 succeeds in the case of FIG. 6, the AP 6 executes a second AP determination process that is regarding whether or not a specific value obtained by decrypting the digital signature DS1 is identical to a value obtained by hashing the information in the received SCont for printer (that is, the hash value HV, the "Group1", and the public key PPK2). In the case of FIG. 6, the AP 6 determines "identical" in the second AP determination process, thus it determines that the authentication of the information in the DReq succeeds, and executes processes from T404. The fact that the AP6 determines "identical" in the second AP determination process means that the information in the received SCont for printer (that is, the hash value HV, the "Group1", and the public key PPK2) has not been tampered by a third party since the second CO was stored in the printer 100. On the other hand, in a case where the AP 6 determines "not identical" in the first AP determination process, in a case where the decryption of the digital signature DS1 fails, or in a case where the AP 6 determines "not identical" in the second AP determination process, the AP 6 determines that the authentication fails and does not execute the processes from T404.

Next, in T404, the AP 6 creates a connection key CK (that is, a shared key) by using the obtained public key PPK2 of the printer 100 and the stored secret key ask2 of the AP 6 in accordance with the ECDH.

In T410, the AP 6 sends a DPP Peer Discovery Response (hereinbelow termed simply as "DRes") including the SCont for AP to the printer 100.

In response to receiving the DRes from the AP 6 in T410 via the Wi-Fi I/F 116, the printer 100 executes a process for authenticating the sender of the DRes (that is, the AP 6) and the information in the DRes (that is, the hash value HV, the "Group1", and the public key APK2). Specifically, in T412, the printer 100 firstly executes a first PR determination process that is regarding whether or not the hash value HV and the group ID "Group1" in the received SCont for AP are respectively identical to the hash value HV and the group ID "Group1" in the SCont for printer included in the stored second CO. In the case of FIG. 6, the printer 100 determines "identical" in the first PR determination process, thus it determines that the authentication of the sender of the DRes (that is, the AP 6) succeeds. The fact that the hash value HV in the received SCont for AP is identical to the hash value HV in the SCont for printer included in the stored second CO means that the SCont for printer and the SCont for AP were created by the same device (that is, the terminal 10). As such, the printer 100 also determines that authentication of the creator of the received SCont for AP (that is, the terminal 10) succeeds. Further, the printer 100 decrypts the digital signature DS2 in the received SCont for AP by using the public key TPK2 of the terminal 10 included in the stored second CO. Since the decryption of the digital signature DS2 succeeds in the case of FIG. 6, the printer 100 executes a second PR determination process that is regarding whether or not a specific value obtained by decrypting the digital signature DS2 is identical to a value obtained by hashing the information in the received SCont for AP (that is, the hash value HV, the "Group1", and the public key APK2). In the case of FIG. 6, the printer 100 determines "identical" in the second PR determination process, thus it determines that the authentication of the information in the DRes succeeds, and executes processes from T414. The fact that the printer 100 determines "identical" in the second PR determination process means that the information in the received SCont for AP (that is, the hash value HV, the "Group1", and the public key APK2) has not been tampered with by a third party since the first CO was stored in the AP 6. On the other hand, in a case where the printer 100 determines "not identical" in the first PR determination process, in a case where the decryption of the digital signature DS2 fails, or in a case where the printer 100 determines "not identical" in the second PR determination process, the printer 100 determines that the authentication fails and does not execute the processes from T414.

In T414, the printer 100 creates a connection key CK by using the stored secret key psk2 of the printer 100 and the public key APK2 of the AP 6 in the received SCont for AP in accordance with the ECDH. Here, the connection key CK created by the AP 6 in T404 and the connection key CK created by the printer 100 in T414 are identical to each other. Due to this, the connection key CK for establishing the Wi-Fi connection is shared between the printer 100 and the AP 6. When T414 is completed, the process of FIG. 6 is terminated.

As aforementioned, after the connection key CK is shared between the printer 100 and the AP 6, the printer 100 and the AP 6 execute the 4way-handshake communication by using the connection key CK in T40 of FIG. 2. As a result, the Wi-Fi connection is established between the printer 100 and the AP 6. As aforementioned, the printer 100 receives the AReq in T200 of FIG. 4 from the terminal 10 by using one communication channel among the plurality of communication channels included in the channel list of the printer 100. That is, the printer 100 receives the AReq in T200 from the terminal 10 by using the communication channel which both the printer 100 and the terminal 10 can use. On the other hand, in T40 of FIG. 2, the printer 100 establishes the Wi-Fi connection with the AP 6 by using the communication channel which both the printer 100 and the AP 6 can use. Here, the communication channel which the terminal 10 can use and the communication channel which the AP 6 can use may differ in some cases. In this embodiment, the communication channel by which the printer 100 receives the AReq from the terminal 10 in T200 of FIG. 4 is different from the communication channel by which the printer 100 establishes the Wi-Fi connection with the AP 6 in T40 of FIG. 2. However, in a variant, the former communication channel may be same as the latter communication channel.

Figure 7:
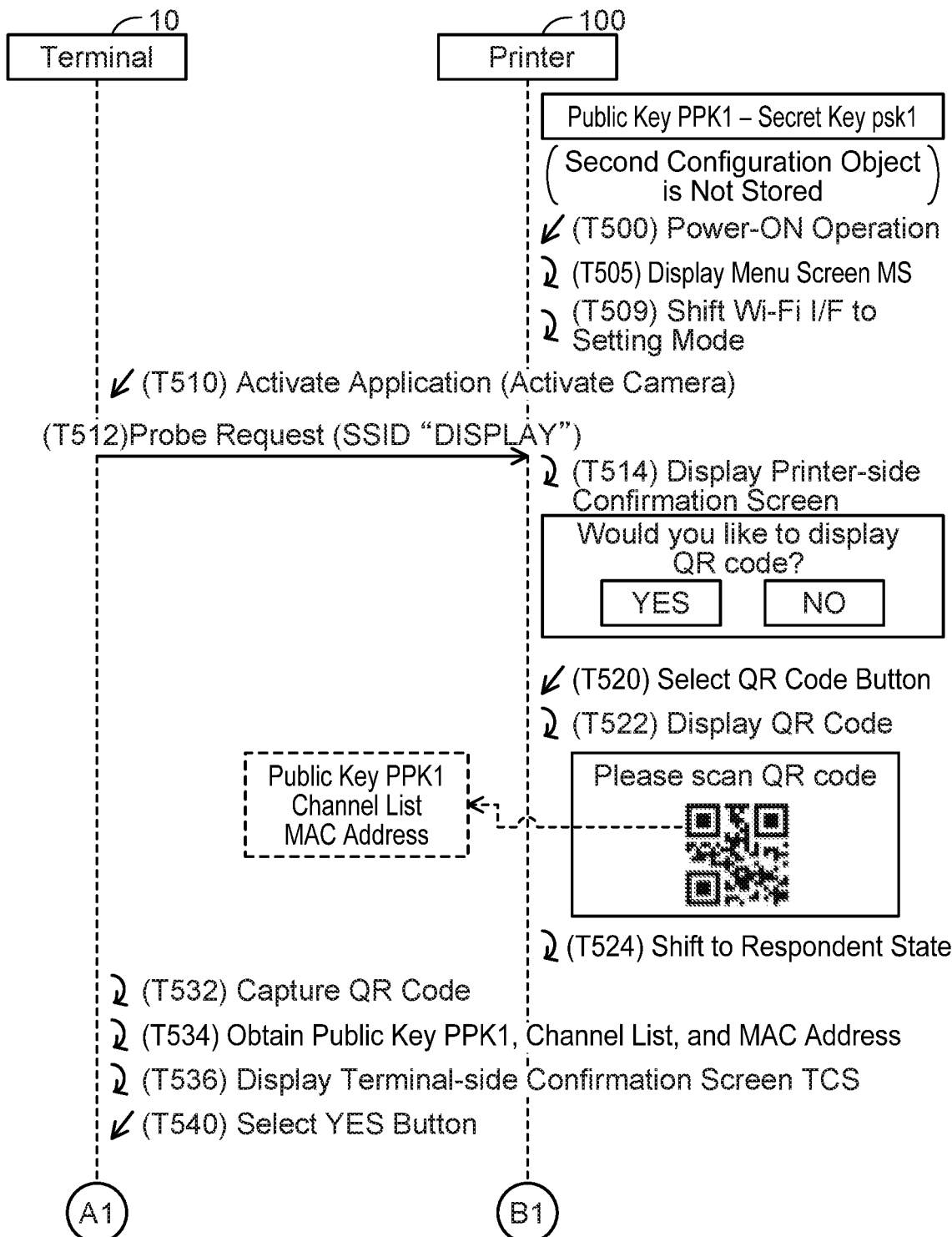
FIG. 7 shows a sequence diagram of a Bootstrapping process of Case B.

(Bootstrapping (BS) of Case B; FIG. 7)

Next, the process of the BS of Case B in T20 of FIG. 2 will be described with reference to FIG. 7. Case B is a state prior to execution of T20 to T40 of FIG. 2, that is, a state in which the memory 134 of the printer 100 has not yet stored the second CO.

T500 and T505 are similar to T100 and T105 of FIG. 3. Since the memory 134 does not store the second CO, the printer 100 supplies the Wi-Fi I/F 116 with a shifting instruction for shifting the operation mode of the Wi-Fi I/F 116, and shifts the operation mode of the Wi-Fi I/F 116 from a normal mode to a setting mode in T509. As such, in the state where the memory 134 does not store the second CO, the operation mode of the Wi-Fi I/F 116 is shifted automatically from the normal mode to the setting mode simply by the user turning on the power of the printer 100. The normal mode is a mode incapable of interpreting a Probe Request (hereinbelow termed simply as "PReq", see T512 to be described later) (that is, a mode in which the PReq is ignored even if it is received). The setting mode is a mode capable of interpreting the PReq (that is, a mode in which information in the PReq is supplied to the CPU 132 when the PReq is received).

In response to accepting the activation operation for the app 40 by the user, the terminal 10 activates the app 40 in T510, and further activates the camera 15. In this case, the terminal 10 broadcasts the PReq via the Wi-Fi I/F 16 in T512. This PReq includes an SSID "DISPLAY" that is preset in the app 40. A character string of the SSID in the PReq is not limited to "DISPLAY", and may be any character string which the printer 100 is capable of interpreting.

In response to receiving the PReq from the terminal 10 via the Wi-Fi I/F 116 in T512, the printer 100 obtains the SSID "DISPLAY" from the Wi-Fi I/F 116. In this case, since the SSID includes the preset character string "DISPLAY", the printer 100 determines that a condition for executing processes from T514 is satisfied and causes the display unit 114 to display a printer-side confirmation screen PCS in T514. The screen PCS is a screen inquiring the user whether or not to cause the printer 100 to display the QR code, and includes a YES button indicating that the printer 100 is to be caused to display the QR code and a NO button indicating that the printer 100 is not to be caused to display the QR button. Due to this, in a case where the user does not wish to establish the Wi-Fi connection (such as a case where the user activated the app 40 by mistake) for example, the user can prevent the QR code from being displayed by selecting the NO button in the screen PCS.

Further, when the PReq including the SSID "DISPLAY" is broadcasted in T512, there is a possibility that the screen PCS is displayed on a printer that is different from the printer 100. In this case, the user can prevent the QR code from being displayed in this different printer by selecting the NO button in the screen PCS displayed on the different printer.

In response to the YES button in the screen PCS being selected by the user in T520, the printer 100 causes the display unit 114 to display the QR code in T522 and shifts from the non-respondent state to the respondent state in T524. T532 to T540 are similar to T132 to T140 of FIG. 3. When the process of T540 is completed, the process of FIG. 7 is terminated. Thereafter, the Wi-Fi connection is established between the printer 100 and the AP 6 by processes similar to those of FIGS. 4 to 6 being executed by the respective devices 6, 10, 100.

Although not shown, in Case A of FIG. 3 as well, the printer 100 shifts the operation mode of the Wi-Fi I/F 116 from the normal mode to the setting mode in response to accepting the power-ON operation by the user in T100. However, in Case A of FIG. 3, the QR code is displayed due to the processes of T106 to T120 being executed before the app 40 is activated in the terminal 10. Due to this, the printer 100 does not execute the process of T514 of FIG. 7.

Figure 8:
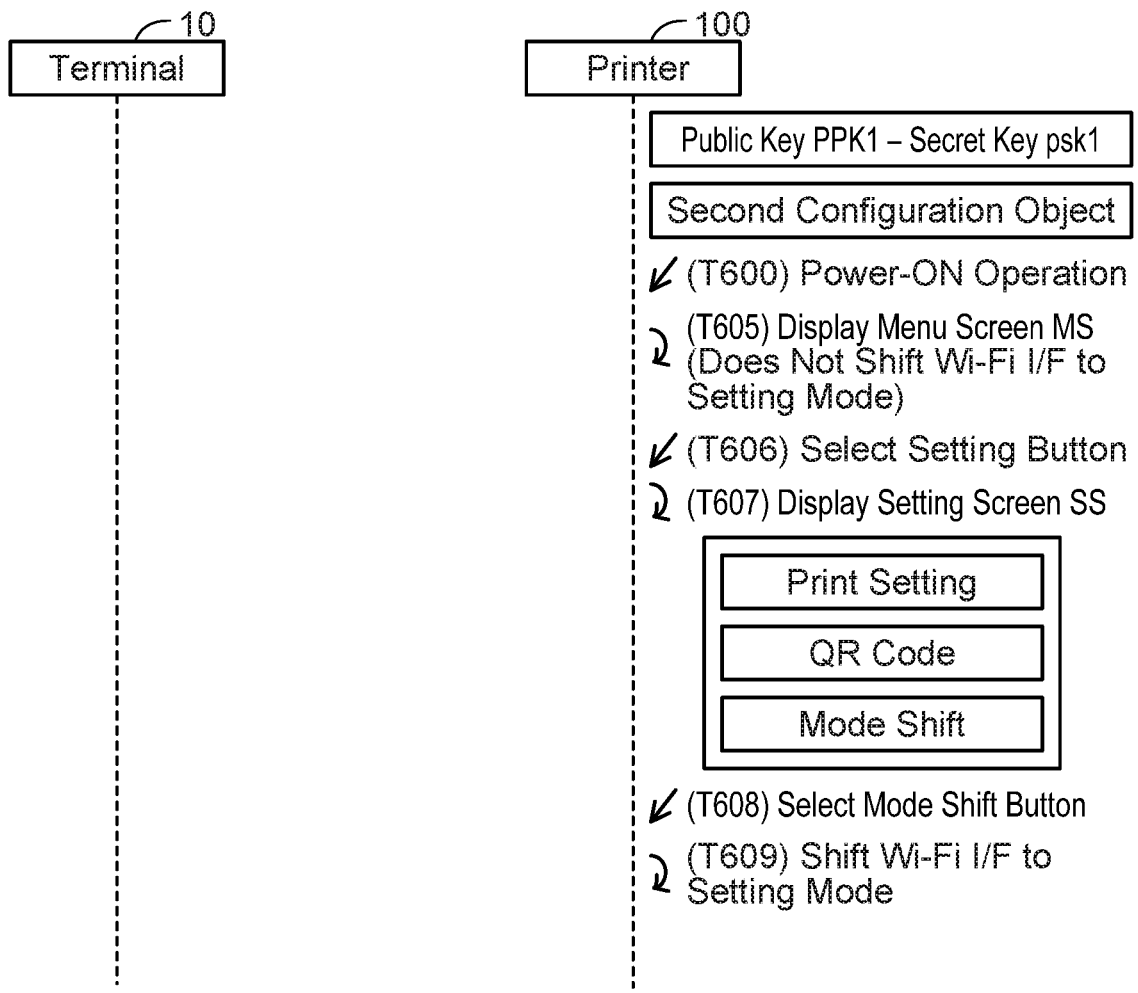
FIG. 8 shows a sequence diagram of a Bootstrapping process of Case C.

(Bootstrapping (BS) of Case C; FIG. 8)

Next, the process of the BS of another Case C will be described with reference to FIG. 8. Case C is a state after T20 to T40 of FIG. 2 have been executed, that is, a state in which the memory 134 of the printer 100 already stores the second CO.

T600 and T605 are similar to T500 and T505 of FIG. 7. Since the memory 134 of the printer 100 stores the second CO in the present case, the printer 100 does not shift the operation mode of the Wi-Fi I/F 116 from the normal mode to the setting mode. In the situation where the second CO is stored, the printer 100 can establish the Wi-Fi connection with the AP 6 by using the second CO. As such, a possibility that the BS is executed in the printer 100 is low. Under such a situation, the printer 100 does not shift the operation mode of the Wi-Fi I/F 116 to the setting mode, so the QR code can be prevented from being displayed unnecessarily.

Under the situation where the printer 100 stores the second CO, the user may wish to establish a Wi-Fi connection between the printer 100 and an AP that is different from the AP 6, for example. In such a case, the user can select the setting button in the screen MS in T606 and select the mode shift button in the screen SS (T607) displayed in accordance with the user's selection in T608. In this case, the printer 100 shifts the operation mode of the Wi-Fi I/F 116 from the normal mode to the setting mode in T609. Due to this, when receiving the PReq from the terminal 10, the printer 100 executes the processes from T514 of FIG. 7 and can thereby receive a new CO from the terminal 10.

The printer 100 may establish a Wi-Fi connection with the AP 6 according to a normal Wi-Fi scheme (that is, a scheme using an SSID and a password), without using the DPP scheme. In this case, the memory 134 of the printer 100 stores wireless setting information (that is, the SSID and the password) for establishing the Wi-Fi connection with the AP 6. Even when the power of the printer 100 is turned on in such a situation, the printer 100 does not shift the operation mode of the Wi-Fi I/F 116 from the normal mode to the setting mode, similarly to Case C of FIG. 8. This is because the printer 100 can establish the Wi-Fi connection with the AP 6 by using the wireless setting information. Due to this, the processes for establishing the Wi-Fi connection between the printer 100 and the AP 6 can be prevented from being executed when the printer 100 is capable of establishing the Wi-Fi connection with the AP 6.

(Bootstrapping (BS) of Case D; FIG. 9)

Next, the process of the BS of another Case D will be described with reference to FIG. 9. Case D assumes a situation in which the QR code displayed on the printer 100 is not captured by the terminal 10.

T700 to T724 are similar to T500 to T524 of FIG. 7. In the present case, the AReq (see T200 of FIG. 4) is not sent from the terminal 10 to the printer 100 due to the QR code displayed on the printer 100 not being captured by the terminal 10. In this case, the printer 100 determines in T726 that the AReq is not received within a predetermined time since it shifted to the respondent state in T724, and shifts from the respondent state to the non-respondent state in T728. Due to this, the printer 100 can be prevented from continuing to be in the respondent state over a long period of time. In other words, the state in which a signal that the Wi-Fi I/F 116 received from outside is supplied to the CPU 132, that is, the state in which the CPU 132 processes a signal received from outside, can be prevented from continuing to take place. Due to this, processing load of the printer 100 can be reduced. Then, in T730, the printer 100 causes the display unit 114 to display an error screen indicating that the AReq was not received from the terminal 10. When the process of T730 is completed, the process of FIG. 9 is terminated.

(Effects of Embodiment)

In the present embodiment, the printer 100 displays the QR code obtained by coding the public key PPK1 (T522, T622, T722) in the case of receiving the PReq including the SSID "DISPLAY" from the terminal 10 (T512 of FIG. 7, T612 of FIG. 8, T712 of FIG. 9). As a result, the public key PPK1 is obtained by the terminal 10 (T534, T634). After this, the printer 100 receives the AReq in which the public key TPK1 is used from the terminal 10 (T200 of FIG. 4), sends the ARes to the terminal 10 (T210), and receives the second CO from the terminal 10 (T310 of FIG. 5). Due to this, the printer 100 can establish the Wi-Fi connection with the AP 6 by using the second CO (T40 of FIG. 2).

Further, in this embodiment, the printer 100 shifts from the non-respondent state to the respondent state (T524, T624, T724) in the case of receiving the PReq including the SSID "DISPLAY" from the terminal 10 (T512 of FIG. 7, T612 of FIG. 8, T712 of FIG. 9). Due to this, the printer 100 can send the ARes to the terminal 10 (T210) in the case of receiving the AReq from the terminal 10 (T200 of FIG. 4). Then, the printer 100 receives the second CO from the terminal 10 (T310 of FIG. 5) and thus can establish the Wi-Fi connection with the AP 6 by using the second CO (T40 of FIG. 2).

For example, a user who has knowledge on wireless communication or operation of the printer 100 may be able to select the setting button in the screen MS in T106, select the QR code button in the screen SS in T108, and cause the printer 100 to display the QR code (T122) and shift to the respondent state (T124) as with Case A of FIG. 3. However, a user with poor knowledge of the above matters may not be able to suitably perform the selection operations as above. According to the present embodiment, as shown in Case B of FIG. 7, the printer 100 displays the QR code (T522) and shifts to the respondent state (T524) in the case of receiving the PReq including the predetermined SSID from the terminal 10, even if T106 and T108 of FIG. 3 are not performed by the user. Due to this, even the user with poor knowledge on wireless communication can easily cause the printer 100 to display the QR code and shift to the respondent state by activating the app 40 of the terminal 10.

(Corresponding Relationships)

The printer 100, the terminal 10, and the AP 6 are respectively examples of "communication device", "first external device", and "second external device". The display unit 114 and the Wi-Fi I/F 116 are respectively example of "output unit" and "wireless interface". The PReq including the SSID "DISPLAY", and the public key PPK1 and the QR code of the printer 100 are respectively example of "specific signal", "public key", and "specific information". The AReq, the ARes, and the second CO are respectively examples of "authentication request", "authentication response", and "connection information". The Wi-Fi connection established in T40 of FIG. 2 is an example of "wireless connection".

The selecting operation on the QR button in T120 of FIG. 3 is an example of "predetermined operation". The screen PCS is an example of "instruction screen". The selecting operation on the mode shift button in T608 of FIG. 8 is an example of "specific operation". Accepting the power-ON operation by the user in the state where the second CO is not stored in the memory 134 and accepting the selection on the mode shift button by the user in the state where the second CO is stored in the memory 134 are examples of "predetermined condition". The normal mode and the setting mode are respectively examples of "first mode" and "second mode". The channel list, the communication channel used in T200 of FIG. 4, and the communication channel used in T40 of FIG. 2 are respectively examples of "communication channel information", "first communication channel", and "second communication channel". Elapse of the predetermined time in T726 of FIG. 9 is an example of "specific condition". The hash values HV in SCont for AP and the second CO are respectively examples of "received information" and "authentication information".

The process of T512 of FIG. 7 (or T612 of FIG. 8, T712 of FIG. 9), the process of T522 (or T622, T722), the process of T200 of FIG. 4, the process of T210, the process of T310 of FIG. 5, and the processes of T35 and T40 are respectively examples of "receive a specific signal from a first external device", "cause the output unit to output specific information", "receive an authentication request", "send an authentication response", "receive connection information", and "establish the wireless connection between the communication device and the second external device".

The process of T512 of FIG. 7 (or T612 of FIG. 8, T712 of FIG. 9), the process of T524 (or T624, T724), the process of T200 of FIG. 4, the process of T210, the process of T310 of FIG. 5, and the processes of T35 and T40 are respectively examples of "receive a specific signal from a first external device", "shift an operation state of the communication device from a non-respondent state to a respondent state", "receive an authentication request", "send an authentication response", "receive connection information", and "establish the wireless connection between the communication device and the second external device".

(Variant 1) For example, the QR code displayed on the printer 100 in T122 of FIG. 3 may not be one in which the channel list and the MAC address "abc" are coded. That is, the QR code may simply be a code image obtained by coding at least the public key PPK1. In this case, in response to shifting from the non-respondent state to the respondent state in T124, the printer 100 monitors receipt of an AReq using one wireless channel among all wireless channels which the printer 100 is capable of using. Further, in T200 of FIG. 4, the terminal 10 sequentially broadcasts the AReq by sequentially using all wireless channels which the terminal 10 is capable of using. That is, "specific information" may simply be information that can be obtained by using at least the public key.

(Variant 2) The processes for creating the shared key (for example, SK1) (such as T142, T202 of FIG. 4) are not limited to the processes according to the ECDH described in the above embodiment, but may be other processes according to the ECDH. Further, the processes for creating the shared key are not limited to the processes according to the ECDH, and processes according to other schemes (such as Diffie-Hellman key exchange (DH)) may be executed instead. Further, in the above embodiment, the digital signatures DS1 and DS2 are created according to the ECDSA, however, they may be created according to other schemes (such as Digital Signature Algorithm (DSA), Rivest-Shamir-Adleman cryptosystem (RAS), etc.).

(Variant 3) For example, in T512 of FIG. 7, the terminal 10 may send a Service Discovery Request according to a WFD scheme to the printer 100, instead of the PReq. This Request includes information for inquiring whether or not the printer 100 is capable of executing the display of the QR code. In this variant, the Service Discovery Request is an example of "specific signal".

(Variant 4) When the PReq including the SSID "DISPLAY" is broadcasted in T512 of FIG. 7, there is the possibility that the screen PCS is displayed in a printer that is different from the printer 100. To address such a situation, the printer 100 may broadcast a PReq that instructs to stop displaying the screen PCS in response to receiving the AReq from the terminal 10 in T200 of FIG. 4. This PReq includes a predetermined character string (such as an SSID "NOT DISPLAY") for stopping the display of the screen PCS. With such a configuration, even when the screen PCS is displayed in the printer different from the printer 100, the display of the screen PCS can be stopped without accepting an operation by the user.

(Variant 5) For example, the printer 100 may cause the print executing unit 118 to print the QR code on a print medium, instead of causing the display unit 114 to display the QR code in T522 of FIG. 7. In this variant, the Wi-Fi connection can be established between the printer 100 and the AP 6 by executing the communication according to the DPP scheme, for example, even in a situation where the printer 100 is not provided with the display unit 114 and cannot display screens such as the screen MS in T105 of FIG. 3, the screen SS in T107, and the screen for the QR code in T122. In this variant, the print executing unit 118 is an example of "output unit". In another variant, the printer 100 may be provided with a wireless interface that is different from the Wi-Fi I/F 116 (such as a Near Field Communication (NFC) I/F, a Bluetooth (registered trademark) I/F). The Bluetooth I/F includes a wireless interface configured to execute communication complying with the Bluetooth scheme version 4.0 or higher. In this case, in T522 of FIG. 7, the printer 100 may send the public key PPK1, the channel list, and the MAC address "abc" to the terminal 10 via this wireless interface. In this variant, the wireless interface that is different from the Wi-Fi I/F 116 is an example of "output unit". Further, in this variant, "specific information" may not be "code image".

(Variant 6) In a variant, the printer 100 may calculate a receipt radiowave intensity of the PReq in response to receiving the PReq from the terminal 10 in T512, and may cause the display unit 114 to display the screen PCS in T514 in a case where the calculated receipt radiowave intensity is equal to or greater than a preset threshold. That is, the printer 100 may cause the display unit 114 to display the screen PCS on condition that a distance between the printer 100 and the terminal 10 is equal to or less than a predetermined distance.

(Variant 7) The "DRAFT Device Provisioning Protocol Technical Specification Version 0.2.11", which is the draft standard created by the Wi-Fi Alliance, describes that shared code, key, phrase, and word are called as "code". As such, the printer 100 may cause the display unit 114 to display an image including a shared code, key, phrase, and word obtained by coding the public key PPK1, the channel list, and the MAC address "abc" in T122, instead of the QR code.

(Variant 8) In T35 of FIG. 2, the process of the NA may be executed between the terminal 10 and the printer 100, and a Wi-Fi connection may thereby be established between the terminal 10 and the printer 100. That is, "second external device" may be the same device as "first external device".

(Variant 9) The screen SS displayed in T107 of FIG. 3 may not include the QR code button. In this case, the terminal 10 and the printer 100 execute the process of the BS of Case B in FIG. 7, without executing the process of the BS of Case A in FIG. 3, to establish the Wi-Fi connection between the printer 100 and the AP 6. In this variant, processes to "cause the output unit to output the specific information in a case where a predetermined operation via the operation unit is accepted" and "shift the operation state of the communication device from the non-respondent state to the respondent state in a case where a predetermined operation via the operation unit is accepted" may be omitted.

(Variant 10) In response to receiving the PReq from the terminal 10 in T512 of FIG. 7, the printer 100 may skip the processes of T514 to T520, and may cause the display unit 114 to display the QR code in T522. In this variant, a process to "cause the output unit which is the display unit to display an instruction screen for instructing that the specific information is to be displayed in a case where the specific information is received from the first external device" may be omitted.

(Variant 11) The Wi-Fi I/F 116 of the printer 100 may be configured to operate in the normal mode at all times. In this variant, processes to "shift an operation mode of the wireless interface from a first mode to a second mode" and "store the connection information in the memory" may be omitted.

(Variant 12) The process of Case D of FIG. 9 may not be executed. That is, in the case where the predetermined time has elapsed since the printer 100 shifted to the respondent state, the printer 100 may not shift from the respondent state to the non-respondent state. In this variant, a process to "shift the operation state of the communication state from the respondent state to the non-respondent state in a case where a specific condition is satisfied after the operation state of the communication device has been shifted to the respondent state" may be omitted. Further, in another variant, in T726 of FIG. 9, the printer 100 may monitor accepting, from the user, an instruction indicating shift to the non-respondent state, instead of monitoring the elapse of the predetermined time. In this variant, accepting the instruction from the user is an example of "specific condition".

(Variant 13) In the above embodiment, the Wi-Fi connection between the printer 100 and the AP 6 is established by using the terminal 10. Instead of this, for example, a Wi-Fi connection may be established between the printer 100 operating as a Group Owner (G/O) of the WFD scheme (that is, a device operating as a parent station) and another device (that is, a device operating as a child station) by using the terminal 10. That is, "second external device" may not be "parent station".

(Variant 14) "Communication device" may not be the printer, and may be another device such as a scanner, a multi-function peripheral, mobile terminal, a PC, and a server.

(Variant 15) In the embodiment above, the processes of FIGS. 2 to 9 are implemented by software (that is, the program 136), however, at least one of these processes may be implemented by hardware such as a logic circuit.

What is claimed is:

1. A communication device comprising:
   an output unit;
   a wireless interface;
   a processor; and
   a memory storing computer-readable instructions therein, the computer-readable instructions, when executed by the processor, causing the communication device to:
   receive a specific signal from a first external device via the wireless interface;
   after the specific signal has been received from the first external device, cause the output unit to output specific information, the specific information having been obtained by using a public key;
   after the specific information has been outputted, receive an authentication request in which the public key is used from the first external device via the wireless interface;
   in a case where the authentication request is received from the first external device, send an authentication response to the first external device via the wireless interface;
   after the authentication response has been sent to the first external device, receive connection information from the first external device via the wireless interface, the connection information being for establishing a wireless connection between the communication device and a second external device via the wireless interface; and
   in a case where the connection information is received from the first external device, establish, by using the connection information, the wireless connection between the communication device and the second external device via the wireless interface.

2. The communication device as in claim 1 further comprising:
   an operation unit,
   wherein the computer-readable instructions, when executed by the processor, further cause the communication device to:
   in a case where a predetermined operation via the operation unit is accepted, cause the output unit to output the specific information,
   wherein after the specific signal has been received from the first external device, the specific information is outputted even if the predetermined operation is not accepted via the operation unit.

3. The communication device as in claim 1, wherein the specific information is a code image obtained by coding the public key.

4. The communication device as in claim 3, wherein the code image is a QR code.

5. The communication device as in claim 1, wherein the output unit is a display unit configured to display an image, and
   the specific information is displayed on the output unit.

6. The communication device as in claim 5, further comprising:
   an operation unit,
   wherein the computer-readable instructions, when executed by the processor, further cause the communication device to:
   in a case where the specific information is received from the first external device, cause the output unit which is the display unit to display an instruction screen for instructing that the specific information is to be displayed,
   wherein in a case where it is instructed in the instruction screen via the operation unit that the specific information is to be displayed, the specific information is displayed on the output unit.

7. The communication device as in claim 1, wherein the computer-readable instructions, when executed by the processor, further cause the communication device to:
   in a case where a predetermined condition is satisfied, shift an operation mode of the wireless interface from a first mode in which the wireless interface is incapable of interpreting the specific signal to a second mode in which the wireless interface is capable of interpreting the specific signal,
   wherein in a situation where the operation mode of the wireless interface is the second mode, the specific information is outputted after the specific signal has been received from the first external device, and
   in a situation where the operation mode of the wireless interface is the first mode, the specific information is not outputted after the specific signal has been received from the first external device.

8. The communication device as in claim 7, wherein the computer-readable instructions, when executed by the processor, further cause the communication device to:
   in a case where the connection information is received from the first external device, store the connection information in the memory,
   wherein in a case where the communication device is turned on in a situation where the connection information is not stored in the memory, the predetermined condition is satisfied, and wherein in a case where the communication device is turned on in a situation where the connection information is stored in the memory, the predetermined condition is not satisfied.

9. The communication device as in claim 8 further comprising:
an operation unit,
wherein in a case where a specific operation is accepted via the operation unit in the situation where the connection information is stored in the memory, the predetermined condition is satisfied.

10. The communication device as in claim 1, wherein the computer-readable instructions, when executed by the processor, further cause the communication device to:
after the specific signal has been received from the first external device, shift an operation state of the communication device from a non-respondent state to a respondent state, the non-respondent state being a state in which the authentication response is not sent in response to receiving the authentication request from the first external device, and the respondent state being a state in which the authentication response is sent to the first external device in response to receiving the authentication request from the first external device,
wherein in a case where the authentication request is received from the first external device after the operation state of the communication device has shifted to the respondent state, the authentication response is sent to the first external device via the wireless interface.

11. The communication device as in claim 10, wherein
the specific information is obtained by using the public key and communication channel information, the communication channel information indicating a first communication channel which is predetermined at the communication device,
the communication channel information is obtained by the first external device due to the specific information being outputted,
the respondent state is a state in which receipt of the authentication request by using the first communication channel from the first external device is monitored and the authentication response is sent to the first external device in response to receiving the authentication request from the first external device, and
in a case where the authentication request by using the first communication channel is received from the first external device after the operation state of the communication device has been shifted to the respondent state, the authentication response is sent to the first external device via the wireless interface.

12. The communication device as in claim 11, wherein the wireless connection is established between the communication device and the second external device via the wireless interface by using a second communication channel different from the first communication channel.

13. The communication device as in claim 10, wherein the computer-readable instructions, when executed by the processor, further cause the communication device to:
in a case where a specific condition is satisfied after the operation state of the communication device has shifted to the respondent state, shift the operation state of the communication device from the respondent state to the non-respondent state.

14. The communication device as in claim 10 further comprising:
an operation unit,
wherein the computer-readable instructions, when executed by the processor, further cause the communication device to:
in a case where a predetermined operation via the operation unit is accepted, shift the operation state of the communication device from the non-respondent state to the respondent state, and
after the specific signal has been received from the first external device, the operation state of the communication device is shifted from the non-respondent state to the respondent state even if the predetermined operation is not accepted via the operation unit.

15. The communication device as in claim 1, wherein the connection information includes authentication information for authenticating received information which is received from the second external device.

16. The communication device as in claim 1, wherein the computer-readable instructions, when executed by the processor, further cause the communication device to:
after the authentication response has been sent to the first external device, cause the communication device to operate as an Enrollee according to a Wi-Fi standard,
wherein the first external device operates as a Configurator according to the Wi-Fi standard.

17. A non-transitory computer-readable recording medium storing computer-readable instructions for a communication device, wherein the computer-readable instructions, when executed by a processor of the communication device, cause the communication device to:
receive a specific signal from a first external device via a wireless interface;
after the specific signal has been received from the first external device, cause an output unit to output specific information, the specific information having been obtained by using a public key;
after the specific information has been outputted, receive an authentication request in which the public key is used from the first external device via the wireless interface;
in a case where the authentication request is received from the first external device, send an authentication response to the first external device via the wireless interface;
after the authentication response has been sent to the first external device, receive connection information from the first external device via the wireless interface, the connection information being for establishing a wireless connection between the communication device and a second external device via the wireless interface; and
in a case where the connection information is received from the first external device, establish, by using the connection information, the wireless connection between the communication device and the second external device via the wireless interface.

18. The non-transitory computer-readable recording medium as in claim 17,
wherein in a case where a predetermined operation via an operation unit is accepted, cause the output unit to output the specific information, and
wherein after the specific signal has been received from the first external device, the specific information is outputted even if the predetermined operation is not accepted via the operation unit.

19. The non-transitory computer-readable recording medium as in claim 17, wherein the specific information is a code image obtained by coding the public key.

20. A method executed by a communication device, the method comprising:
- receiving a specific signal from a first external device via a wireless interface;
- after the specific signal has been received from the first external device, causing an output unit to output specific information, the specific information having been obtained by using a public key;
- after the specific information has been outputted, receiving an authentication request in which the public key is used from the first external device via the wireless interface;
- in a case where the authentication request is received from the first external device, sending an authentication response to the first external device via the wireless interface;
- after the authentication response has been sent to the first external device, receiving connection information from the first external device via the wireless interface, the connection information being for establishing a wireless connection between the communication device and a second external device via the wireless interface; and
- in a case where the connection information is received from the first external device, establishing, by using the connection information, the wireless connection between the communication device and the second external device via the wireless interface.

* * * * *